United States Patent Office 2,815,728
Patented Dec. 10, 1957

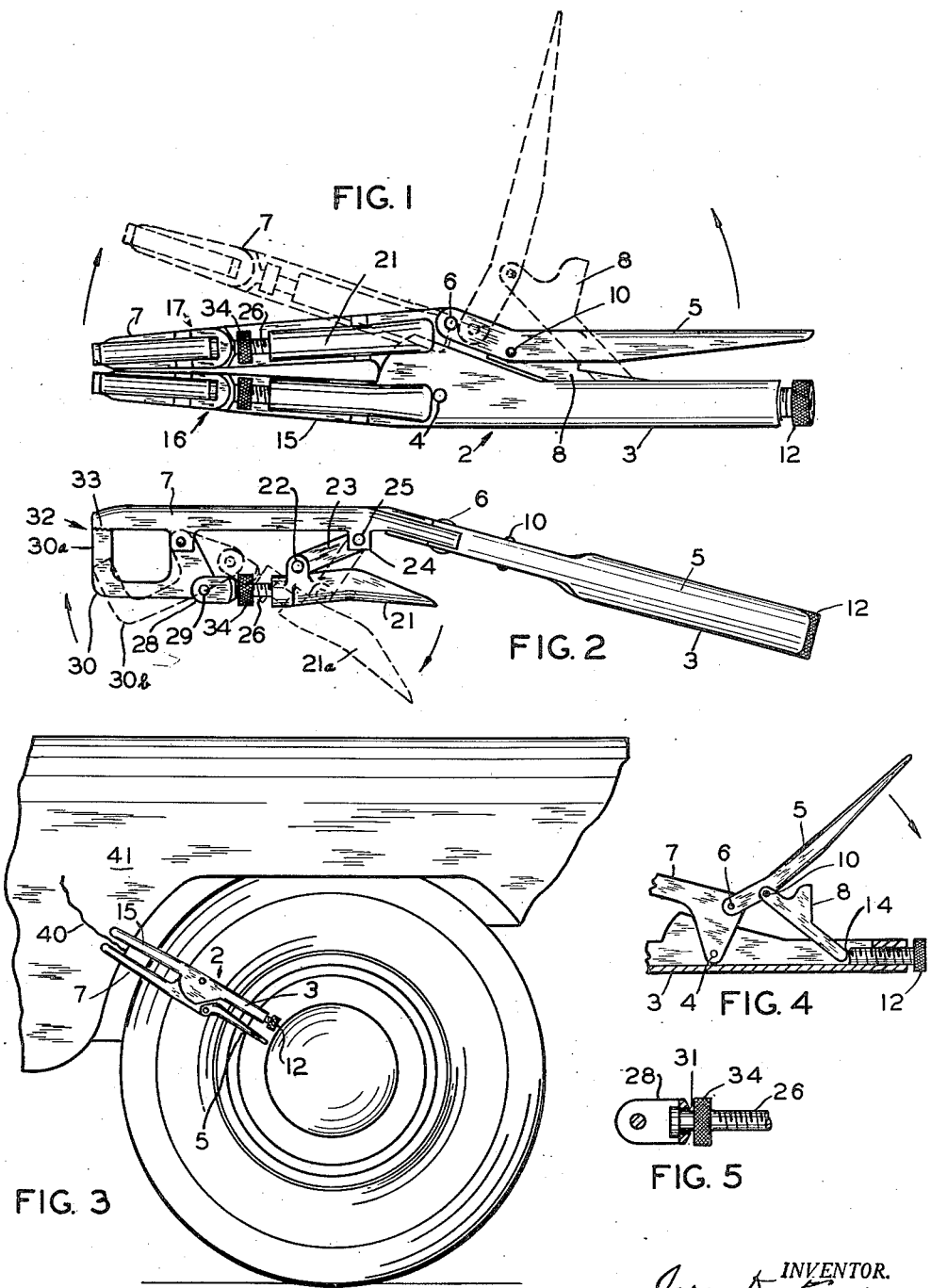

2,815,728

HOLDING DEVICES FOR WELDING METAL PARTS

Jerry K. Fenimore, Sunnyslope, Ariz.

Application March 12, 1956, Serial No. 571,082

5 Claims. (Cl. 113—99)

This invention pertains to devices for holding pieces of metal in place for welding, brazing, or the like.

One of the objects of the invention is to provide a triple clamp, which is of the automatic toggle type, that may be used first, for holding individual pieces of material to be welded in the same plane, and, second, for bringing them together in a position to be finally welded;

A second object is to provide metal piece holders of the twin grip toggle type which may be adjusted to take various thicknesses of material and hold them by a toggle leverage arrangement and combine them with a general large holding mechanism operating on the toggle jaw principle so that when the dead center position over which the toggle functions is once set the two pieces to be held may be brought together by a simple manual operation and will be held definitely in position without clamps or clamping screws;

Another object is to provide a holding jig or fixture for multiple parts which are to be welded together, wherein the parts are held by toggle operated jaws in one plane and the held parts are then brought together and held by a toggle clamp in a plane at right angles to the holding clamps.

Other objects will appear hereinafter.

I attain the foregoing objects by means of the devices, parts and combination of parts shown in the accompanying drawings, in which—

Figure 1 is a plan view of a holding clamp and fixture embodying my improvements with movement of several parts shown in dotted outline;

Figure 2 is a side elevation of the device as shown in Figure 1;

Figure 3 is an elevation of one application and use of the holding clamp, with the clamp drawn on a smaller scale;

Figure 4 is a sectional elevation of one of the toggle clamps used on my device, and Figure 5 is a vertical mid sectional view through the clevis and adjusting screw of one of the work holding clamps.

Similar numerals refer to similar parts in the several views.

Referring to the drawing, 2 indicates the frame of the main holding clamp generally. This frame consists broadly of a handle 3, and a forwardly extending stationary jaw 15. A movable jaw 7 is pivoted by pin 4 to the mid portion of frame 2. A clamp handle 5 is hinged on pin 6 to the movable jaw 7 and is hinged to toggle link 8, by a pin at 10 outwardly from pin 6. The outer end of link 8 bears on the inner end of adjusting screw 12 in frame part 3 at a point marked 14. Adjustment of screw 12 in or out of the base handle part 3 will vary the point at which pins 6 and 10 pass dead center and, therefore, lock the closing motion of jaw 7 as it moves toward the stationary jaw 15.

On the stationary jaw portion 15 there is a toggle clamp generally indicated by number 16. The jaws of this clamp operate in a plane at right angles to the swing of or operational plane of the movable frame jaw 7 with reference to stationary jaw 15.

The details of toggle clamp 16 are shown in Figure 2 and it is to be noted that it has a handle 21 pivoted at 22 to a link 23 which is in turn pivoted to lugs 24 on the body of jaw 7 by a pin 25. The forward end of handle 21 is connected by adjusting link screw 26 to the upper raised rear portion of L shaped jaw 30 by clevis 28. A pin 29 through the clevis attaches it pivotally to the inner end of L shaped work holding jaw 30. The outer end of this jaw is curved toward the face of jaw 7 as shown in Figure 2, and the upward trending portion 30a bears against the end portion of jaw 7 at a position marked by numeral 32. The contacting faces of these jaws may be provided with serrations 33 if desired. A similar work holding toggle clamp 17 is provided for movable jaw 7. The working parts of this clamp are duplicates of those of toggle clamp 16. Movement of handle 21 to the position shown by the dotted lines 21a opens the work holding clamp 16 and causes the jaw 30 to move to the position indicated by the dotted outline 30b. In the fully closed or holding position pin 22 is moved inward (toward the face of jaw 7) until it is beyond aligned or dead center position. This toggle action may be varied by adjusting the length of screw 26 between clevis 28 and the front end portion of handle 21. The front or outer end of screw 26 is retained in clevis 28 by an annular groove 31 so that it will turn freely in the clevis but will resist axial displacement relative to the clevis. Screw 26 is turned by an integrally formed knurled ring 34 which may be provided with opposite flats (not shown) for operation by a wrench. Since clamps 16 and 17 are the same reference numerals are applied only to the former.

It is to be understood that the structure of the work holding jaws enables the user to operate and adjust them from a position above the plane of the main body and handle of the device. For the purposes here intended, any such adjusting means as screw 12, shown in the body portion 2 of the main clamp, would not be practical.

In use, the device is placed beneath an automobile body portion to be repaired as shown in Figure 3. The jaw 7 is open and the work holding clamps, on the inner face of body 2, are adjusted and clamped onto the work on each side of the fender 41 in which the tear 40 is to be repaired. The main clamp jaw 7 is then drawn up and adjusted by the use of screw 12 so as to bring the edges of the tear together.

Since one of the important objects of this holding device is to bring together body portions which have been broken and are displaced, it will be readily understood that once the work holding jaws 16 and 17 are firmly set onto the material, adequate leverage can be applied to the clamp jaw 7 to overcome any tendency of the metal to spread away from tear 40. Once the edges of the metal along this tear are brought together, they are easily held by the three jaws of the clamp.

The device as here disclosed attains its maximum efficiency when used on metal parts which are not only torn or broken, but which are separated by the tension and pull of metal body parts. However, it is obvious that the device can be used wherever two sheets of metal are to be joined, even though there is no tension necessary to bring the edges together.

While the novel work holding clamps 16 and 17 are shown and claimed, and are particularly suitable for this use, it is to be understood that various equivalent clamping means can be used on the frame 2 and jaw 7 and such structure may well be within the spirit of my invention.

I claim:

1. A work holding device comprising a frame including a handle portion and a jaw portion extending therefrom, a jaw privotally mounted on said frame in cooperative relation to said jaw portion of said frame, a second handle hinged to said movable jaw, a toggle link having its opposite ends respectively connected to said frame and said second handle, and a pair of work holding locking toggle clamps movable in a plane at right angles to the movement of said moveable jaw on said frame, said toggle clamps being carried on the jaw portion of said frame and the end portion of said moveable jaw respectively.

2. A work holding device comprising a frame including a handle portion and a jaw portion extending therefrom, a jaw pivotally mounted on said frame in cooperative relation to said jaw portion of said frame, a second handle pivotally secured to said moveable jaw, a toggle link having its oposite ends respectively connected to said frame and said second handle, and a pair of work holding locking toggle clamps movable in a plane at right angles to the movement of said moveable jaw on said frame, said toggle clamps being carried on the jaw portion of said frame and the end portion of said moveable jaw respectively; said work holding clamps including a pair of L shaped jaws pivoted respectively to said frame jaw portion and to said movable jaw, a pair of handle portions pivotally attached respectively to said frame jaw and said moveable jaw, a pair of links pivotally attached respectively to each of said handles, said frame jaw and said moveable jaw, and a toggle adjusting screw between each of the L shaped jaws and their respective handles for varying the point at which the handle passes beyond dead center between said L shaped jaw and said link.

3. A work holding device for clamping sheet metal work parts on each side of a tear and forcibly bringing the edges of the tear together for welding, comprising a frame member with an inner handle portion and a stationary jaw portion extending outward therefrom, a movable jaw pivotally carried centrally on said frame, a second handle hinged to said movable jaw and extending over said frame handle portion, a toggle link pivotally attached to said second handle and extending into the handle portion of said frame, and a toggle link adjusting screw threaded into the end of said frame handle portion, having its inner end bearing on the end portion of said toggle link, and adapted to vary the point of toggle action of said clamp handle and toggle link, as said second handle pivotally moves said movable jaw toward said stationary jaw, in combination with work clamps on said stationary jaw and movable jaw, each having locking toggle clamps operating in planes substantially at right angles to the plane of movement of said movable jaw and adapted to clamp a work sheet to be welded extending in a plane parallel to the pivotal motion of said movable jaw.

4. A work holding device for clamping sheet metal work parts on each side of a tear and forcibly bringing the edges of the tear together for welding, comprising a frame member with an inner handle portion and a stationary jaw portion extending outward therefrom, a movable jaw pivotally mounted centrally on said frame, a second handle pivoted to said movable jaw and extending over said frame handle, a toggle link pivotally attached to said second handle and extending into the handle portion of said frame, and a toggle link adjusting screw threaded into the end of said frame handle portion, having its inner end bearing on the end portion of said toggle link, and adapted to vary the point of toggle action of said second handle and toggle link, as said second handle pivots said movable jaw toward said stationary jaw; said stationary jaw and movable jaw having side faces parallel with the plane of movement of said movable jaw; together with a pair of work holding locking toggle clamps mounted respectively on the side faces of said stationary jaw and movable jaw, each including an L-shaped jaw pivoted to the face of the jaw on which it is mounted inwardly from the end of the jaw, a clevis transversely pivoted to the upper rear portion of the L shaped jaw, a toggle adjusting screw rotatably held by said clevis, a clamping handle having threaded means receiving said adjusting screw at its forward end, and a toggle link pivotally attached to the forward portion of said handle at its outer end, and pivotally attached to the face of the jaw, on which the L-shaped jaw is attached, at its inner end; said handle being adapted to close the forward end of said L shaped clamp down on said jaw face when pressed toward said face and to clamp said jaw closed when the pivot on said handle toggles inward relative to the pivot at the inner end of said toggle link, and the pivot on said clevis; said screw varying the point of toggle so that the L-shaped clamp will accept and hold various thicknesses of metal.

5. A work holding device for clamping sheet metal work parts on each side of a tear and forcibly bringing the edges of the tear together for welding, comprising a frame member with an inner handle portion and a stationary jaw portion extending outward therefrom, a movable jaw pivoted centrally on said frame, a second handle pivoted to said movable jaw and extending over said frame handle, a toggle link pivotally attached to said second handle and extending into the handle portion of said frame, and a toggle link adjusting screw threaded into the end of said frame handle portion having its inner end bearing on the end portion of said toggle link, and adapted to vary the point of toggle action of said second handle and toggle link, as said second handle pivots said movable jaw toward said stationary jaw; said stationary jaw and movable jaw having side faces parallel with the plane of movement of said movable jaw; together with means on the end portions of the side faces of said movable jaw and stationary jaw for lockably attaching to adjacent separated work parts which are to be joined by welding, and for holding and forcibly bring said work parts together.

References Cited in the file of this patent
UNITED STATES PATENTS

| | | |
|---|---|---|
| 1,170,334 | Riggs | Feb. 1, 1916 |
| 2,641,149 | Peterson | June 9, 1953 |
| 2,715,345 | Rozmus | Aug. 16, 1955 |
| 2,737,917 | Steele | Mar. 13, 1956 |